US005620936A

United States Patent [19]
Felix et al.

[11] Patent Number: 5,620,936
[45] Date of Patent: Apr. 15, 1997

[54] RECOVERY OF SPENT CATALYST

[75] Inventors: Vinci M. Felix, Kenneth Square; Charles E. Mosheim, Zionsville, both of Pa.; Norman A. Carlson, Hockessin, Del.

[73] Assignees: E. I. DuPont de Nemours and Company, Wilmington, Del.; Cabot Performance Material, Boyertown, Pa.

[21] Appl. No.: 166,495

[22] Filed: Dec. 14, 1993

[51] Int. Cl.$^6$ ............................. B01J 20/34; B01J 35/60
[52] U.S. Cl. .............................. 502/27; 502/22; 502/33; 423/64; 423/65
[58] Field of Search ................. 502/22, 27, 33; 423/62, 63, 64, 65, 68

[56] References Cited

U.S. PATENT DOCUMENTS

| | | | |
|---|---|---|---|
| 2,962,372 | 11/1960 | Foos et al. | 75/121 |
| 3,065,046 | 11/1962 | Foos et al. | 23/18 |
| 3,107,976 | 10/1963 | Koerner et al. | 23/19 |
| 3,112,991 | 12/1963 | Fisher | 23/24 |
| 3,117,833 | 1/1964 | Pierret | 23/19 |
| 3,712,939 | 1/1973 | Capps et al. | 423/63 |
| 3,830,871 | 8/1974 | Mayer et al. | 260/683.68 |
| 3,972,710 | 8/1976 | Meyer | 423/64 |
| 3,976,475 | 8/1976 | Markland | 423/63 |
| 4,065,405 | 12/1977 | Hulme | 502/25 |
| 4,258,225 | 3/1981 | Feiring | 570/168 |
| 4,445,438 | 5/1984 | Theurer et al. | 104/12 |
| 4,451,438 | 5/1984 | Floeter et al. | 423/20 |
| 4,663,130 | 5/1987 | Bergman et al. | 423/63 |
| 4,673,554 | 6/1987 | Niwa et al. | 423/63 |
| 4,967,024 | 10/1990 | Gumprecht et al. | 570/168 |
| 5,209,910 | 5/1993 | Bludssus et al. | 423/63 |
| 5,437,848 | 8/1995 | Hard | 423/7 |

FOREIGN PATENT DOCUMENTS

| | | |
|---|---|---|
| 4021207 | 1/1992 | Germany . |
| 02823 | 3/1990 | WIPO . |
| WO90/02823 | 3/1990 | WIPO . |

OTHER PUBLICATIONS

Edward G. Scheibel, Bench Scale Liquid Extraction Techniques, 49, 1679–1684, Oct. 1957.

A. E. Feiring, Chemistry In Hydrogen Fluoride v. Catalysts For Reaction Of HF With Halogenated Olefins, Journal of Fluorine Chemistry, 13 (1979) 7–18.

*Primary Examiner*—Glenn A. Caldarola
*Assistant Examiner*—Alexander G. Ghyka
*Attorney, Agent, or Firm*—Michael K. Boyer

[57] ABSTRACT

A process is disclosed for converting a spent catalyst from conventional fluorination processes into a commercially useful tantalum or niobium salt such as $K_2TaF_7$ or $K_2NbF_7$. The process broadly relates to dissolving the spent catalyst in water or an aqueous hydrofluoric acid solution, separating and disposing the undissolved residue, extracting the aqueous solution with a suitable solvent such as methyl isobutyl ketone (MIBK), and obtaining useful tantalum products from the MIBK solution such as a tantalum salt.

18 Claims, No Drawings

RECOVERY OF SPENT CATALYST

FIELD OF THE INVENTION

The present invention relates to the field of processing materials such as tantalum pentafluoride ($TaF_5$), or niobium pentafluoride ($NbF_5$) that were used as a catalyst for reacting hydrogen fluoride (HF) with halogenated alkenes or alkanes.

BACKGROUND OF THE INVENTION

A. E. Feiring, Journal of Fluorine Chemistry, 13, 7–18 (1979) discloses using $TaF_5$ as a halogen exchange catalyst for adding HF to tetra and trichloroethene and related compounds. The catalyst is also useful in fluorine-chlorine exchange reactions. The use of $TaF_5$ as a catalyst for the addition of HF to unsaturated compounds was also disclosed by U.S. Pat. No. 4,258,225 to Feiring. Optimum conditions for using tantalum pentafluoride ($TaF_5$), or niobium pentafluoride ($NbF_5$) in certain halogen exchange reactions was disclosed by U.S. Pat. No. 4,967,024 to Gumprecht (which corresponds to Canadian Patent No. 1,323,040. The disclosure of each of the above-identified references is hereby incorporated by reference.

U.S. Pat. Nos. 3,107,976, 3,117,833, 3,712939, 3,972,710, and 4,445,438 disclose processes for recovering tantalum and niobium from ore by digesting the ore, followed by extracting to recover metallic materials. The disclosure of these Patents is also hereby incorporated by reference.

SUMMARY OF THE INVENTION

When conventional fluorination processes are operated commercially, it has been discovered that the halogen exchange catalyst eventually becomes spent or poisoned by being contaminated with impurities. For example, the catalyst can be poisoned by organic by-products, corrosion by-products released by the chemical reactor, or other sources of poison, thereby rendering the poisoned catalyst undesirable for continued employment. The corrosion by-products are typically caused by the high corrosivity of the "superacid" system that is formed during the fluorination process, e.g., a system having a Hammett acidity of about −10 to about −30. Such a superacid system can cause the metals which are used to fabricate a chemical reactor to release corrosion by-products that cause catalyst poisoning. The high replacement cost for the halogen exchange catalyst and the difficulty in safely disposing of poisoned tantalum compounds impose an economic burden upon the previously identified fluorination processes. The present invention solves these problems by providing an efficient method for purifying the spent catalyst, and yielding a purified material suitable for direct reuse, for example, in the fluorination processes or in production of tantalum metal, its compounds or alloys.

The previously identified references disclose numerous methods for obtaining useful tantalum compounds from various ores and slags containing tantalum. These references, however, demonstrate that such methods are tailored to accommodate impurities which are present in the source of tantalum, e.g., these references isolate metallic tantalum and tantalum products from ores containing calcium, uranium and other impurities normally found in tantalum ores. Tantalum ores are dry powders that normally comprise tantalum and niobium which is a naturally occurring co-ingredient in most tantalum ores, in the form of a complex oxide. Conventional ore processing methods remove tantalum and niobium from the ore, and separate tantalum from niobium. In comparison to ore, the starting material of the invention comprises a viscous and relatively reactive mass, which is believed to contain complex chemical compositions involving residual organic materials and metallic fluorides, which include either tantalum or niobium based materials. Further, ore is processed as a particulate whereas the instant invention is operated as a liquid-liquid extraction method wherein substantially only one of the liquid phases contains tantalum or niobium compounds. In contrast to ore processes that employ concentrated acids at high temperatures, the instant invention can be effectively operated at relatively low temperatures, e.g., about 20° to 100° C., with relatively dilute acids. It was, therefore, a surprising and an unexpected that the process of the invention is capable of recovering and/or producing useful compounds from a spent catalyst mixture, e.g., a mixture containing $TaF_5$ and various organic compounds.

The present invention relates to a process for converting the spent catalyst from conventional fluorination processes into a commercially useful tantalum or niobium salt such as $K_2TaF_7$. The process broadly comprises dissolving the spent catalyst into a water or an aqueous hydrofluoric acid solution, separating the undissolved residue, extracting the aqueous solution with a suitable solvent such as methyl isobutyl ketone (MIBK), and preparing useful tantalum or niobium products, e.g., tantalum salts, from the MIBK solution.

DETAILED DESCRIPTION

The poisoned or spent fluorination catalyst that can be treated in accordance with the present invention comprises at least one member from the group consisting of $TaF_5$, $NbF_5$, among others. The catalyst being treated will normally be a member of a complex mixture or co-product containing, for example, poisoned $TaF_5$, other metals such as Ni, Cr, Fe, Mo, Mn, among others, and organic compounds such as olefins, aldehydes, ketones, ethers, alcohols and halogenated organics. Normally, the spent catalyst will include about 3 to 10 wt. % organic materials. On an organic-free basis, the spent catalyst may comprise about 92 to 93 wt % $TaF_5$, about 7 wt % metallic fluoride impurities mainly compounds containing nickel, chromium, molybdenum, iron; chlorides and carbon may also be present. A tantalum containing spent catalyst will typically contain less than about 0.07 wt % niobium.

The process is also effective to treat spent $NbF_5$ catalyst from the equivalent fluorination reaction. In this aspect of the invention, the spent catalyst will typically contain about 89 to 90 wt % $NbF_5$ and less than about 0.1 wt. % tantalum.

The invention relates to a process for converting a spent catalyst containing mixture into a useful product that generally comprising the steps of:

dissolving the spent catalyst into a first water or an aqueous acid solution such as aqueous hydrogen fluoride thereby forming a water-soluble material comprising, for example, $H_2TaF_7$, heating the first solution, for example, to a temperature of about 80° to 110° C. in order to remove volatile organic material, separating the first aqueous solution containing the water-soluble material from any undissolved residue, extracting the tantalum or niobium bearing aqueous solution with at least one suitable extracting agent such as a primary or secondary amine, or methyl isobutyl ketone (MIBK), among other extracting agents known in the art, thereby separating the tantalum or niobium compound from the other soluble metallic fluorides, e.g., the tantalum compound is extracted into the MIBK, extracting the tantalum or niobium compound from the MIBK organic phase into a second aqueous solution, preparing commercial grade tantalum containing products such as a tantalum salt, e.g., $K_2TaF_7$, from the second aqueous solution by crystallization or precipitation caused by the addition of a salt, e.g., a potassium salt. If desired, other products such as tantalum metal can be produced from the tantalum salt. Normally, MIBK is the preferred extracting agent.

When the first aqueous solution comprises water, it is normally desirable to subsequently treat the spent catalyst with an aqueous acid solution, e.g., aqueous HF. The catalyst dissolution rate can be increased by using any suitable means or method for agitating the spent catalyst, e.g., using a mechanical mixer, contacting the catalyst with an aqueous acid under turbulent flow, among other suitable means.

In one aspect of the invention, a salt such as $K_2TaF_7$ could be crystallized from the MIBK phase. For example, a potassium salt can be added to the MIBK phase thereby obviating the step of extracting the tantalum or niobium compound from the MIBK phase into the second aqueous phase.

In another aspect of the invention, an aqueous phase or a raffinate, which contains fluorinated metallic impurities, that is separated from the tantalum containing MIBK phase can be treated with an effective amount of a base, e.g., ammonia, to precipitate metallic compounds. In some cases, the aqueous phase or raffinate is recycled for use in dissolving the spent catalyst.

While any suitable container can be used for transporting or housing the spent catalyst, the design may be varied by those skilled in the art to satisfy the relevant regulatory procedures and safety considerations. In some cases, it is desirable to back-fill the container with an inert gas such as nitrogen in order to enhance storage safety.

The starting material of the inventive process typically comprises a spent fluorination catalyst. After substantially removing the volatile organic impurities of the fluorination reaction from the spent catalyst, the spent catalyst, e.g., poisoned $TaF_5$, will remain behind as a substantially anhydrous pasty mass. While any suitable process can be used for removing the organic impurities, typically such impurities are removed by heating, e.g., to a temperature of at least about 130° C. The remaining pasty mass will typically contain at least one high boiling organic impurity such as tetrachloroethylene, 2-methyl-1-pentene, ethanol, butyl acetate, methylene chloride, cyclohexane, hydrogen fluoride, e.g., unreacted HF, HCl, a relatively small amount of the desired fluorinated organic product, e.g., hydrochlorofluorocarbons (HCFCs) such as HCFC-123 and/or hydrofluorocarbons (HFCs) such as HFC-32, among other substances. The contents of the pasty mass can vary depending upon when the fluorination process was discontinued, the temperature that was used for removing impurities, among other parameters. Normally, this mass will contain at least about 3 wt % up to about 10 wt % of organic impurities.

A sufficient quantity of fluid materials should be retained in the pasty mass in order to permit the mass to be readily discharged from the reactor into the storage container. In some cases, an effective amount of a suitable inert solvent may be added to the mass for improving the discharge rate, e.g., about 1 to about 10 wt. % of a solvent may be added to the pasty mass. Examples of suitable solvents comprise at least one member from the group of HCFC-123, $CH_2Cl_2$, chlorofluorocarbons such as CFC-113, among others. The pasty mass may be discharged from the fluorination reactor into the container either by gravity or under pressure.

After discharging the spent acidic mass into the container, to enhance safe handling and/or storage, it is desirable to modify the mass by substantially removing HF and other relatively volatile impurities, e.g., HCFC-123 or perchloroethylene, methylene chloride, among other volatile impurities. Such removal can be achieved by equipping the container with an appropriate heating means such as steam jacket or electrical heating element. Normally, heating the container to a temperature of about 150 degrees C. is adequate for reducing the quantity of volatile organic impurities to less than about 1 wt %. Any volatile impurities being released from the heated container should be vented through a conventional scrubber.

At least a portion of the modified mass, within the container, is dissolved into a first aqueous solution comprising an effective amount of water or an aqueous hydrogen fluoride solution, e.g., containing about 10 to 15 wt % and usually about 12% by weight HF. While any suitable concentration of aqueous HF can be employed in this aspect of the invention, it is preferable to employ HF in at least stoichometric amounts, i.e., to form $H_2TaF_7$ (commonly known as "fluorotantalic acid"). For best results, deionized water is employed for making the aqueous solutions of the invention. By "effective amount" of aqueous HF solution, it is meant that sufficient HF is present to dissolve substantially all of the tantalum or niobium values as $H_2TaF_7$ or $H_2NbF_7$, and an excess or additional amount of HF present as free HF to inhibit hydrolysis of the $H_2TaF_7$ or the $NbF_7$ into insoluble oxyfluorides. A mechanical mixer, e.g., paddle mixer, is lowered into the vessel and an effective amount of the HF solution is added to the mass of spent catalyst thereby forming a slurry. Typically, the ratio of modified mass to aqueous HF solution within the slurry is about 20 to 30 wt %. Other concentrations of HF and different ratios of HF to the tantalum or niobium containing modified mass can also be used within the scope of this invention. Stirring is maintained for up to about 24 hours to ensure maximum dissolution of the slurred modified mass. During this dissolution step, heat can be generated that typically elevates the temperature of the slurry to about 55 degrees to 65 degrees C. Usually less than about 2–6 wt % of the mass remains insoluble.

In one aspect of the invention, the modified mass is dissolved by adding an effective amount of water or aqueous HF solution to the spent catalyst thereby forming a slurry. The slurry is filtered and a filter cake is obtained that is in turn dissolved by adding an effective amount of water or aqueous HF solution. The filtering and dissolution steps are repeated until substantially all of the modified mass has been dissolved. The filtrate is collected and processed further as described below in greater detail. The remaining insoluble components of the mass, if any, can be discarded.

In another aspect of the invention, the modified mass is dissolved by adding an effective amount of the aqueous HF solution to the spent catalyst in a continuous manner. For example, the aqueous HF solution is continuously circulated into and out of the vessel containing the modified mass by using an intermediate storage tank to collect the dissolved tantalum or niobium values. The heat of reaction that is caused by the circulation is normally sufficient to dissolve or solubilize virtually all of the tantalum or niobium values in the modified mass.

The slurry comprising organic impurities, metallic impurities typically in the form of fluorides, and the solubilized $H_2TaF_7$ or the $H_2NbF_7$ can be transferred into a tank that contains a heating means such as submerged heat exchangers. The slurry can be heated with agitation for a period up to about 24 hours at a temperature of about 100° C. to enhance removal of traces of organic impurities via volatilization.

The solids within the slurry can be separated from the aqueous liquid by using any suitable method. An example of a suitable method comprises passing the slurry through a commercially available filter press. The solids can be collected for disposal, or processed further by being mixed with untreated spent catalyst.

The dissolved tantalum or niobium compound, e.g., $H_2TaF_7$, in the first aqueous solution is extracted and separated from impurities by using an extracting agent, such as methyl isobutyl ketone, commonly known as MIBK. A conventional counter current extraction system can be employed for the extraction and separation. For example, the extraction system can use a series of so-called mixer-settler boxes because two phases are formed by the MIBK, namely, an organic phase (MIBK) containing the extracted tantalum or niobium compound, and an aqueous phase or a raffinite containing the impurities.

Prior to MIBK extraction, the first aqueous solution will typically contain, for example, about 100 to 300 g/l tantalum values as $Ta_2O_5$ in the form of $H_2TaF_7$. Extraction of the tantalum or niobium values from the first aqueous solution is normally conducted at ambient temperatures. The transfer of the tantalum or niobium values from the first aqueous solution into the MIBK is sufficiently rapid such that the contact times of the two phases is relatively short; usually less than about 1 minute. Multiple extraction stages, arranged in a counter current flow pattern can be used to insure maximum extraction and separation of the tantalum or niobium values. While most of the tantalum or niobium values are present in the MIBK phase, the aqueous phase or raffinite may include about 3-4 wt % of the desired values. If desired, the MIBK extraction process can be employed upon the raffinite to increase the recovery of the desired values.

The recovery of the tantalum or niobium from the MIBK phase is typically accomplished by contacting, e.g., stripping, the tantalum or niobium-loaded MIBK with one or more stripping agents such as water or dilute HF in a counter current extraction circuit by using commercially available mixer-settler equipment. The ratio of MIBK phase to the stripping agent is normally about 1 to 3 depending on Ta or Nb concentration in the MIBK phase. The counter current extraction circuit produces a second aqueous solution that contains dissolved $H_2TaF_7$ or $H_2NbF_7$ and an MIBK phase that is essentially tantalum and niobium-free, e.g., less than about 0.05 to about 2 wt % Ta.

The dissolved $H_2TaF_7$ or $H_2NbF_7$ within the second aqueous solution can be precipitated as a salt such as $K_2TaF_7$ by adding at least one potassium-containing salt, such as KCl, KF, among other potassium containing salts. The amount of salt can vary widely; but for best results, the amount of salt is sufficient to cause precipitation of $K_2TaF_7$ or $K_2NbF_7$, i.e., stoichiometric, plus an excess amount of about I to 15 wt %. The precipitated $K_2TaF_7$ or $K_2NbF_7$ can be removed from the solution by conventional crystallization techniques that can be conducted at temperatures which range from ambient to about 100 degrees C. While the $K_2TaF_7$ or $K_2NbF_7$ is normally precipitated after obtaining a relatively concentrated aqueous $H_2TaF_7$ or $H_2NbF_7$ solution, the $K_2TaF_7$ or $K_2NbF_7$ can be formed at any expedient location in the extraction process.

The resultant $K_2TaF_7$ or $H_2NbF_7$ can be recovered as crystallites by filtering, washing and drying by using any suitable conventional method.

In one aspect of the invention, the $K_2TaF_7$ or $K_2NbF_7$ recovered by the processes discussed above is used as a raw material for producing Ta or Nb metal.

While particular emphasis in the above discussion was placed upon recovering $K_2TaF_7$ from spent $TaF_5$ fluorination catalyst, the instant invention can be used for obtaining tantalum or niobium compounds from a wide range of starting materials.

The following example is provided only to illustrate certain aspects of the present invention and not limit the scope of the appended claims.

EXAMPLE

A clean dry container was used for housing spent catalyst that was formed when manufacturing $CF_3CHCl_2$ (HCFC-123) by reacting $CCl_2=CCl_2$ with HF in the presence of a $TaF_5$ catalyst. The reaction was performed substantially in accordance with the process disclosed in U.S. Pat. No. 4,967,024; the disclosure of which is hereby incorporated by reference.

When the container had been stored for about 1 month with a final pressure less than about 10 psig, the container was transported to a location for further processing of the spent catalyst.

An approximately 3 liter aqueous solution of about 6 Normal concentration HF was prepared in a mechanically agitated 6 liter polypropylene vessel under a fume hood. An approximately 1 Kg portion of the previously described spent $TaF_5$ catalyst, which comprised about 58.1 wt. %, was added to the vessel in about 250 gm increments over 30 minute intervals thereby converting the $TaF_5$ to $H_2TaF_7$ (hydrofluotantalic acid).

The solution in the vessel was then agitated by a paddle mixer and heated to about 94 degrees C., and held under agitation for about 24 hours to substantially remove all volatile organic substances from the solution. Water was added as necessary to maintain the initial batch volume. The solution was then cooled to room temperature and vacuum filtered through a polypropylene filter media. The filtrate was stored in a 5 liter polypropylene vessel.

The filter cake was reslurried in about 250 ml of water, agitated for about 8 hours and filtered to recover substantially all of the soluble tantalum. The reslurry procedure was repeated three times, and the reslurry filtrates were added to the initial filtrate.

Water was then added to the filtrate vessel as necessary for a total solution volume of about 3.7 liters. At this point, the solution comprises about 163 gm/liter of $H_2TaF_7$, and an acid concentration of about 3.5 to about 4.0 Normal HF. If the normality of the solution was below 3.5, additional HF was added to bring the acidity to that level. Sulfuric acid was added, whenever necessary, to bring the free acid normality to a range of about 4 to 12.

The filtrate was then contacted with about 5.5 L, which corresponded to an organic to aqueous (O/A) ratio of about 1.5, of methyl isobutyl ketone (MIBK) in a commercially available 10 stage continuous countercurrent laboratory extraction unit to form $H_2TaF_7$. The design of such laboratory extraction units is well known to those skilled in the art, and is described in Industrial and Engineering Chemistry, Vol. 49, No. 10, October 1957, pages 1679-1684, "Bench Scale Liquid Extraction Techniques" by Edward G. Scheibel; the disclosure of which is hereby incorporated by reference.

The $H_2TaF_7$ was extracted by using a MIBK solution while the metallic impurities remain in the an aqueous phase or a so-called raffinate.

The MIBK solution was then stripped with about 7.7 L, which corresponded to an O/A ratio of about 0.8/1, of deionized water in the 10 stage extraction unit. The aqueous solution was essentially free of metallic impurities, as shown in the following table comparing the aqueous feed to the MIBK extraction unit, the aqueous raffinate from the MIBK extraction unit, and the purified aqueous solution:

TABLE 1

Comparison of Purities (in Grams/liter)

| Component | Aqueous Feed* | Aqueous Raffinate** | Purified Aqueous Soln+ |
|---|---|---|---|
| $H_2TaF_7$ | 163.0 | 2.5 | 75.5 |
| Ni | 1.1 | 1.2 | <0.02 |
| Cr | 0.33 | 0.36 | <0.02 |
| Mo | 0.08 | 0.09 | <0.02 |
| Co | 0.08 | 0.13 | <0.02 |
| Fe | 9.4 | 9.8 | <0.02 |

*Measured by using ion exchange separation
**Measured by using Directly Coupled Plasma (DCP)
+Measured by precipitation with ammonia The 7550 ml of purified aqueous solution was then agitated and heated to about 95 degrees C., and was maintained at this temperature for about three hours or until the volume was reduced to about 7030 ml. Then about 244 gm of 70% HF and about 240 gm of reagent grade potassium chloride were added to the purified solution. Deionized water was added as required to maintain a volume of about 7550 ml. The solution was heated to about 95 degrees C. and agitated for about 30 minutes. The solution was then cooled to room temperature without agitation, allowing crystals of $K_2TaF_7$ to precipitate. The solution and crystals were vacuum filtered through a polypropylene filter media and the crystals were washed with about 300 ml of deionized water. The washing step was repeated eight times to substantially remove soluble salts. The washed $K_2TaF_7$ crystals were then dried at about 110 degrees C. for about 24 hours in an air atmosphere. The purity of the $K_2TaF_7$ is listed below. Analysis for carbon was performed using a LECO CS444 Analyzer. Metallic contaminant concentrations were determined by emission spectrographic methods. The moisture content was determined by the Karl Fischer method.

| | |
|---|---|
| C | <25 ppm |
| Fe | <10 ppm |
| Ti | <10 ppm |
| Cu | <10 ppm |
| Ni | <10 ppm |
| Cr | <10 ppm |
| Mo | <10 ppm |
| Al | <10 ppm |
| $H_2O$ | <200 ppm |

While few aspects of the invention have been described in detail, one of ordinary skill would recognize that other embodiments and variations are encompassed by the appended claims.

The following is claimed:

1. A method for treating spent niobium or tantalum containing catalyst comprising:

dissolving the spent catalyst in water or an aqueous acid to form a first aqueous solution comprising $H_2TaF_7$ or $H_2NbF_7$, wherein the spent catalyst contains organic impurities, and metallic impurities comprising at least one of Fe, Mo, Ni, and Cr, separating said aqueous solution that contains niobium or tantalum compounds from any undissolved residue, extracting the niobium or tantalum compounds from said aqueous solution with an extracting agent comprising MIBK thereby forming an extracting agent phase, extracting the niobium or tantalum compound from said phase into a second aqueous solution, precipitating the extracted niobium or tantalum compound from the second aqueous solution, and;

recovering niobium or tantalum salt products from the second aqueous solution.

2. A method for recovering tantalum or niobium compounds comprising the steps of:

dissolving a material comprising a contaminated tantalum or niobium catalyst in water or an aqueous acid to form a first aqueous solution wherein said contaminated material comprises metallic fluorides not from Group V-B, separating said aqueous solution that contains niobium or tantalum compounds from any undissolved residue, extracting the niobium or tantalum compounds from said aqueous solution with an extracting agent comprising MIBK thereby forming an extracting agent phase, extracting the niobium or tantalum compound from said phase into a second aqueous solution, precipitating the extracted niobium or tantalum compound from the second aqueous solution, and;

recovering niobium or tantalum salt products from the second aqueous solution.

3. A method for making tantalum salts from spent tantalum fluoride catalyst comprising the steps of:

dissolving the spent catalyst in water or an aqueous acid to form a first aqueous solution comprising $H_2TaF_7$ or $H_2NbF_7$ wherein the spent catalyst contains organic impurities, metallic fluorides not from Group V-B, and at least one of HF and HCl, separating said aqueous solution that contains tantalum compounds from any undissolved residue, extracting the tantalum compounds from said aqueous solution with an extracting agent comprising MIBK thereby forming an extracting agent phase, extracting tantalum compound from said phase into a second aqueous solution, converting the tantalum compound into a salt, and;

recovering the tantalum salt.

4. The method of claims 1 or 2 wherein the aqueous acid comprises aqueous hydrogen fluoride that forms a first aqueous phase comprising $H_2TaF_7$ or $H_2NbF_7$.

5. The method of claims 1 or 3 wherein said recovery comprises adding a salt to the second aqueous solution that causes a niobium or tantalum salt to precipitate out of said aqueous phase.

6. The method of claim 6 wherein the added salt is a member selected from the group consisting of KCl KF and a mixture thereof: and the precipitated salt comprises $K_2TaF_7$ or $K_2NbF_7$.

7. The method of claims 1 or 3 wherein organic impurities is a member selected from the group consisting of HCFC-123. HFC-32, perchloroethylene, methylene chloride and mixtures thereof.

8. The method of claims 1, 2 or 3 wherein the spent catalyst or said material contains up to about 65 wt. % tantalum compounds and about 0.25 to about 1.0 wt % niobium.

9. The method of claims 1 or 2 wherein the spent catalyst or said material contains up to about 50 wt % niobium compounds and about 0.25 to about 1.0 wt % tantalum.

10. The method of claims 3 or 5 wherein the tantalum salts or niobium salts comprises a fluoride or chloride.

11. The method of claims 1, 2, or 3 wherein said method is performed at ambient temperatures and pressures.

12. The method of claim 11 wherein said temperature ranges from about 20° to about 100° C.

13. The method of claims 1, 2, or 3 wherein the dissolving step is a batch process comprising filtering the first aqueous solution.

14. The method of claims 1, 2, or 3 wherein said aqueous acid comprises about 10 to 15 wt % hydrogen fluoride.

15. A method for making niobium or tantalum salts comprising:

contacting water or an aqueous acid with a niobium or tantalum containing material to form a first aqueous solution comprising $H_2TaF_7$ or $H_2NbF_7$, heating said first aqueous solution to a temperature less than about 100° C., separating said aqueous solution from any undissolved residue, extracting the niobium or tantalum compounds from said aqueous solution with an extracting agent comprising MIBK thereby forming an extracting agent phase, scrubbing the extracting agent phase with sulfuric acid, extracting the niobium or tantalum compound from said phase into a second aqueous solution, convening the extracted niobium or tantalum compound into a salt, and;

recovering a niobium or tantalum salt.

16. The method of claims 1, 2, 3 or 15 wherein an aqueous acid is used to form the first aqueous solution and the acid comprises about 10 to 15 wt % hydrogen fluoride.

17. The method of claims 1 or 3 wherein the organic impurities range from about 3 to about 10% by weight.

18. The method of claims 1, 2, 3, or 15 wherein the extracting agent is employed in a continuous process.

* * * * *